Jan. 7, 1964     N. D. FULTON     3,116,900
PILOT ESCAPE DEVICE FOR AIRCRAFT
Filed July 26, 1955
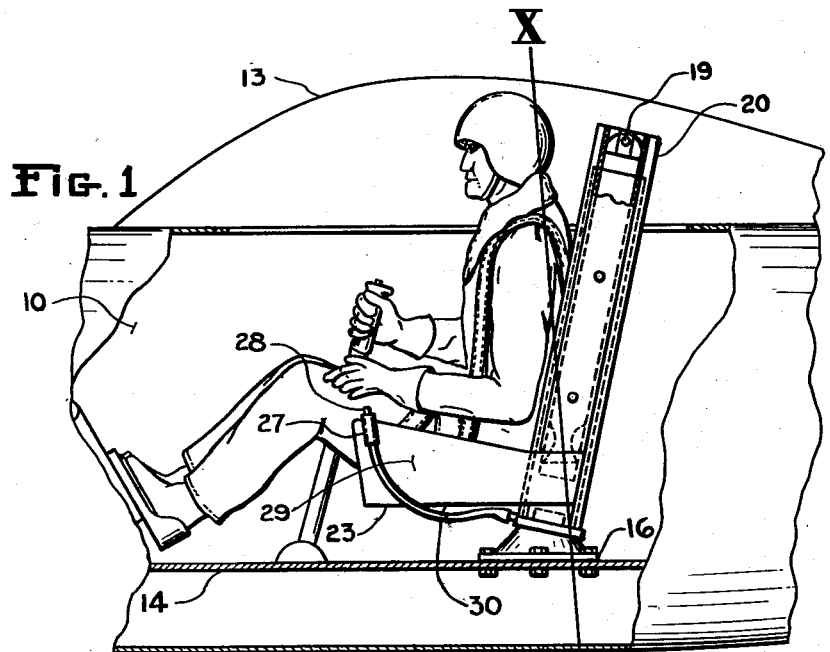
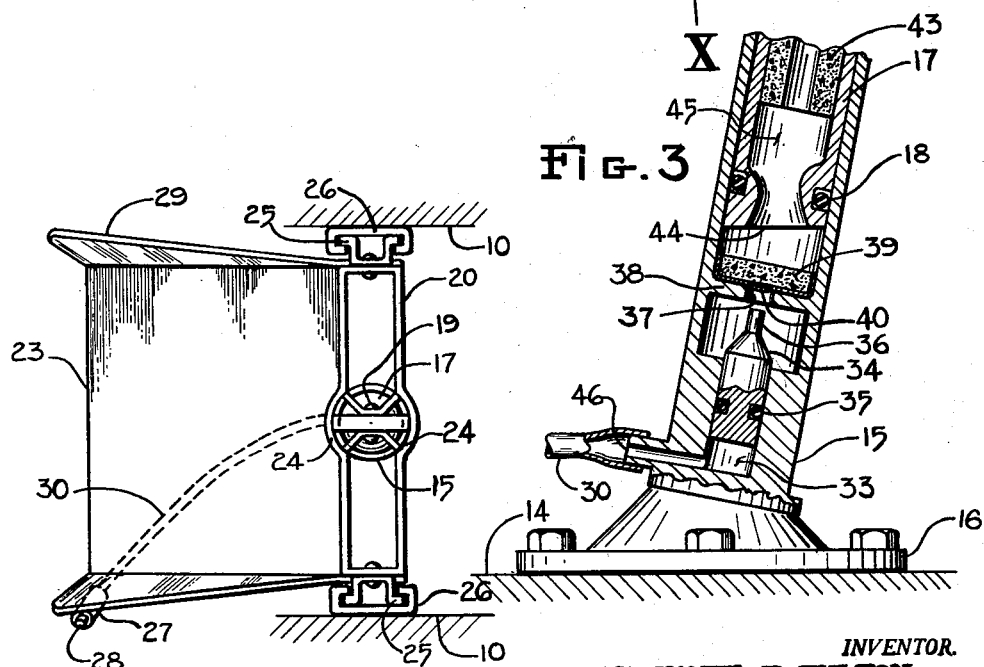
INVENTOR.
NATHANIEL D. FULTON
BY
*William R. Wright, Jr.*
AGENT

United States Patent Office 3,116,900
Patented Jan. 7, 1964

3,116,900
PILOT ESCAPE DEVICE FOR AIRCRAFT
Nathaniel D. Fulton, Bernardsville, N.J., assignor, by mesne assignments, to Thiokol Chemical Corporation, a corporation of Delaware
Filed July 26, 1955, Ser. No. 524,411
10 Claims. (Cl. 244—122)

This invention relates generally to ejection devices and more particularly to a device for safely and quickly ejecting a pilot and his seat from high-speed aircraft while in flight, regardless of the altitude of the aircraft at the time.

Over the last dozen years, military aircraft speeds have steadily mounted to the supersonic range. Because of the extreme aerodynamic and maneuver forces which accompany these velocity conditions and the resultant higher landing speeds of such aircraft, it has become necessary to develop various types of devices for the ejection of aircraft personnel under emergency conditions. These operate essentially against the inertia load of the pilot and seat and project the load beyond any aircraft obstructions—and particularly the empennage—after which the parachute is released from its pack.

However most aircraft failures occur at low altitudes where it is not possible to use conventional ejection devices since the altitude is not available which will allow parachute opening and safe descent. Even if sufficient altitude were available, it is most desirable that the pilot remain with the disabled craft as long as possible in order to direct it away from congested areas or to attempt a forced landing if the opportunity presents itself.

In the case of an attempted forced landing, the outcome is frequently not certain until the aircraft is below altitudes at which escape by conventional ejection devices is possible. Thus, a real need exists for an ejection device which permits escape at the last moment as, with it, if it becomes evident that the forced landing is going to be successful, the aircraft may be saved.

The use of a rocket powered ejecting device is disclosed by the patent to Kleinhans, No. 2,552,181, dated May 8, 1951. However, the propulsive efficiency of a conventional rocket is very low until motion commences and the attendant delay in attainment of rated thrust is extremely disadvantageous for the purpose in question. Obviously, when immediate escape from a disabled aircraft is required, the time necessary for the unconstrained jet gases to impart sufficient velocity to the occupant and seat may well too long, regardless of altitude. In addition to the possibly fatal slowness of an unenclosed rocket ejecting device, there is the further likelihood of its setting the aircraft on fire which is undesirable even though the aircraft is being abandoned.

Accordingly, the chief object of the present invention is to provide an improved ejecting device for the pilot and seat of high-speed aircraft which will obviate the above and other disadvantageous characteristics of known ejecting devices.

Another important object of the present invention is to provide an improved ejecting device for high-speed aircraft which, when ejection has been initiated, will complete ejection in the shortest time possible commensurate with tolerable acceleration forces on the pilot.

Another important object of the present invention is to provide an improved ejecting device which may be operated at substantially ground level to eject a pilot and seat to a safe altitude at which a parachute may be used.

A further important object of the present invention is to provide an improved ejecting device employing an enclosed rocket system enabling high initial acceleration and sustained thrust upon clearing the aircraft.

A still further important object of the present invention is to provide an improved rocket ejecting device which eliminates one of the three tubes required by conventional ejecting devices in order to obtain the necessary "stroke."

Other objects and advantages of the present invention will become apparent during the course of the following description.

In its broadest aspects, the invention contemplates the use of an initially enclosed rocket system which provides the high initial acceleration required of ejecting devices and then provides sustained thrust which carries the pilot to a safe parachuting height even though the system was initiated at ground level.

In the drawings I have shown one embodiment of the invention. In this showing:

FIGURE 1 is a side elevational view partly in section of the invention in operative position in the fuselage of an aircraft;

FIGURE 2 is a top plan view thereof; and

FIGURE 3 is an enlarged, fragmentary, central vertical sectional view of the rocket ejecting means, parts being shown in elevation.

Referring to the drawings, numeral 10 indicates the fuselage of an aircraft having a pilot's cockpit including a canopy 13 and a floor 14. A rearwardly inclined catapult tube 15 is fixed midway between the sides of the fuselage 10 to the floor 14 by means of a bracket 16.

An inner catapult tube 17 comprising the rocket motor to be described, fits slidably within the fixed tube 15 and includes an O-ring seal 18 against the escape of propulsive gases between the tubes. The inner tube 17 is pivotally connected at its upper end at 19 by means of a bracket to the center of the hollow back 20 of the seat 23.

The seat 23 is guided in its upward sliding movement within the cockpit by the hollow back 20 (FIGURE 2) which, at its central portion is provided with vertically elongated, opposed arcuate portions 24 which closely engage the outer surface of the fixed catapult tube 15. The co-operating guide rails 25 and 26 serve an incidental purpose of preventing rotation of the seat 23 about the fixed catapult tube 15. The principal function of guide rails 25 and 26, however, is to steady seat 23 in its course upward until it clears the cockpit or other appurtenances of the aircraft.

An initiator comprising a source of high pressure gas 27 having a control 28 is mounted on the sides 29 of the seat 23 and is connected by a tube 30 to a chamber 33 in the base of the catapult tube 15. A piston 34 including an O-ring seal 35 is mounted in the chamber 33 and terminates in a firing pin 36 in alignment with an aperture 37 formed in a partition 38 in the tube 15.

A rocket ignitor 39, which is usually black powder in a waterproof container, is positioned on the partition 38 and, when a percussion cap 40 mounted over the aperture 37 is detonated by the firing pin 36, the ignitor 39 furnishes the necessary pressure and temperature required to ignite the main sustaining charge 43 in the inner catapult tube 17, the lower end of which terminates in a downwardly and rearwardly inclined jet nozzle 44. This is shown to be a solid charge, although a liquid propellant may be used, and it supplies the high pressure gases required to drive the pilot and seat out of the aircraft and clear of obstructions.

It is to be noted that because the gases are confined within the fixed outer tube 15 and the sliding inner tube 17, there is no fire hazard; moreover, the thrust generatiton is substantially immediate and until the sliding inner tube 17 clears the upper end of the outer tube 15, the action of this invention is almost identical with conventional catapults. An important difference is that the gases are being generated in the high pressure rocket chamber 45 and discharged through its nozzle 44 into the lower pressure, increasing volume of the outer tube 15. This "high-low" action results in a more uniform performance over the wide ambient temperature ranges encountered in aircraft than does the "single" pressure operation of conventional catapults.

The operation of the ejecting means comprising the present invention is believed to be readily apparent. In an emergency and after having made the decision to abandon the aircraft, the pilot removes the canopy 13 by conventional means provided for the purpose. He then assumes a prescribed ejection position by placing his feet on seat mounted supports (not shown) and grasps hand grips of which the initiator 27 may be an integral part.

The pilot now presses the control 28 to actuate the initiator and feed high pressure gas through the tube 30 to the chamber 33 which actuates the firing pin 36 to detonate the percussion cap 40 in the ignitor 39. The main charge 43 is thus ignited and the high pressure gases drive the pilot and seat out of the aircraft and clear of obstructions.

It is to be noted that, as distinguished from conventional ejection devices, once separation of the tubes 15 and 17 occurs, the thrust of the gases does not cease. It is the continuing thrust of the rocket which makes possible the escape at extremely low altitude by propelling the pilot and seat to an altitude which will permit a safe descent by parachute.

The powered altitude to which the pilot is propelled may be considerably less than the terminal altitude to which he coasts depending upon the acceleration to which he is subjected. The following table is an example of the same:

| Rocket Thrust (lbs.) | Acceleration (g's) | Thrust Duration (Sec.) | Powered Height (Ft.) | Terminal Height [1] (Ft.) |
|---|---|---|---|---|
| 500 | .543 | 5.4 | 285 | 430 |
| 1,000 | 2.10 | 2.0 | 165 | 430 |
| 3,500 | 9.86 | 0.48 | 81 | 430 |

[1] Above aircraft. This is considered a safe altitude above ground. (The propelled wt. is 325 lbs.)

It will be appreciated that the initiator may also provide means, such as a double throw toggle switch, to enable the pilot to choose either routine catapult ejection or this followed by rocket sustainer as above. If routine ejection is desired at higher altitudes, the ignitor would ignite a cartridge separate from the main charge.

It will now be readily apparent that the ejecting device comprising the present invention enables immediate ejection of the pilot and seat upon initiation thereof, the ejection force being continued upon separation of the two tubes by the rocket until a safe altitude is reached. Moreover, being enclosed, the gases cannot set the aircraft afire while one of the conventional three tubes used for "stroke" is eliminated. Thus, all of the foregoing ensures a safe ejection at extremely low altitudes for the pilots of disabled aircraft.

It is to be understood that the form of the invention herewith shown and described is to be taken as a preferred example of the same and that various changes in the shape, size and arrangement of parts may be resorted to without departing from the spirit of the invention or the scope of the subjoined claims.

What is claimed is:

1. A device for ejecting a seat from a vehicle comprising in combination, a tube having one closed end fixed to the vehicle, said closed end including a transverse reactive surface for high pressure gases released in said tube, a seat arranged in the vehicle, a rocket including a convergent-divergent exhaust nozzle mounted in the open end of said tube and connected to said seat to eject it from the vehicle when the rocket is fired, said exhaust nozzle being closely spaced from said reactive surface of said closed end so that the exhaust gases of the rocket when fired act against said reactive surface of the tube to provide a high initial acceleration of the rocket and seat therefrom, and continue to exert thrust when the rocket has cleared the open end of said tube.

2. The combination recited in claim 1 wherein said seat includes motion-directing guide means cooperating with and parallel to said tube to facilitate the ejection of said seat from the vehicle.

3. The combination recited in claim 1 wherein the sides of the vehicle include tracks and said seat includes guide means cooperating with said track to prevent rotation of said seat upon ejection movement of said rocket and seat.

4. The combination recited in claim 1 wherein means are provided in said tube for igniting said rocket.

5. The combination recited in claim 4 wherein said means comprises an ignition charge including a detonator mounted below and adjacent the nozzle of said rocket in said tube, a firing pin mounted in said tube below, adjacent, and in alignment with said detonator, and means for actuating said firing pin.

6. The combination recited in claim 5 wherein said actuating means comprises high pressure gas.

7. The combination recited in claim 5 wherein said firing pin is fixed to one end of a piston and said actuating means comprises a source of high pressure gas adapted to act on the other end of the piston.

8. Apparatus for ejecting a pilot and seat from an aircraft comprising in combination an upwardly and rearward inclined support tube having a closed lower end connected to said aircraft, a rocket tube having a closed upper end connected to said seat, said rocket tube extending downwardly into said support tube and being slidably supported therein, a solid propellant charge in said rocket tube, said rocket tube having a downwardly and rearwardly inclined nozzle at its lower end, a second charge positioned in the lower portion of said support tube and adapted when ignited to generate hot gases for igniting said solid propellant, and pilot-operated means for initiating combustion of said second charge.

9. Apparatus for ejecting a pilot and seat from an aircraft comprising, in combination, a catapult tube extending along the back of said seat and having an integral closed lower end connected to said aircraft; a rocket tube having a closed upper end connected to said seat, said rocket tube extending downwardly into said catapult tube and being slidably supported therein; a propellant charge in said rocket tube; a nozzle mounted in the lower end of said rocket tube; igniter means positioned within the space defined by said rocket and catapult tubes for igniting said propellant charge; and pilot-operated means for activating said igniter means.

10. Apparatus for ejecting a pilot and seat from an aircraft comprising, in combination, an upwardly and rearwardly inclined support tube having an integral closed lower end connected to said aircraft; a rocket tube having a closed upper end connected to said seat, said rocket tube extending downwardly into said support tube and being slidably supported therein, said rocket tube having a downwardly and rearwardly inclined nozzle at its lower end; a propellant charge in said rocket tube; igniter means positioned within the space defined by said rocket and support tubes for igniting said propellant charge; and pilot-operated means for activating said igniter means.

References Cited in the file of this patent

UNITED STATES PATENTS

| | | |
|---|---|---|
| Re. 23,981 | Stanley | Apr. 12, 1955 |
| 2,527,020 | Martin | Oct. 24, 1950 |
| 2,552,181 | Kleinhans | May 8, 1951 |
| 2,579,683 | Lobelle | Dec. 25, 1951 |
| 2,661,692 | Vegren | Dec. 8, 1953 |
| 2,681,619 | Chandler | June 22, 1954 |
| 2,702,680 | Heinemann et al. | Feb. 22, 1955 |
| 2,856,820 | Schmued et al. | Oct. 21, 1958 |

FOREIGN PATENTS

| | | |
|---|---|---|
| 702,149 | Great Britain | Jan. 13, 1954 |
| 918,006 | Germany | Sept. 20, 1954 |

OTHER REFERENCES

"Aviation Week" Magazine, November 12, 1956, pages 71, 72, 74, 77.